(12) United States Patent  
Tolle et al.

(10) Patent No.: US 7,961,188 B2  
(45) Date of Patent: Jun. 14, 2011

(54) PERSISTENT FORMATTING FOR INTERACTIVE CHARTS

(75) Inventors: Kristin Michele Tolle, Redmond, WA (US); Jenefer Lea Monroe, Sammamish, WA (US); Stephen Michael Heijster, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1085 days.

(21) Appl. No.: 11/294,038

(22) Filed: Dec. 5, 2005

(65) Prior Publication Data

US 2007/0126736 A1    Jun. 7, 2007

(51) Int. Cl.  
*G06F 17/00* (2006.01)

(52) U.S. Cl. ....................................................... 345/440

(58) Field of Classification Search .................... 345/340  
See application file for complete search history.

(56) References Cited

U.S. PATENT DOCUMENTS

| | | | | |
|---|---|---|---|---|
| 5,581,678 A * | 12/1996 | Kahn | ............................ | 345/440 |
| 5,619,631 A * | 4/1997 | Schott | ........................... | 345/440 |
| 5,666,477 A * | 9/1997 | Maeda | ........................... | 345/440 |
| 5,894,311 A * | 4/1999 | Jackson | ......................... | 345/440 |
| 6,320,586 B1 * | 11/2001 | Plattner et al. | ................. | 715/700 |
| 6,411,313 B1 | 6/2002 | Conlon et al. | | |
| 6,626,959 B1 | 9/2003 | Moise et al. | | |
| 6,700,575 B1 * | 3/2004 | Bovarnick et al. | ............. | 345/440 |
| 6,750,864 B1 | 6/2004 | Anwar | | |
| 2002/0154176 A1 * | 10/2002 | Barksdale et al. | ............. | 345/853 |
| 2003/0160855 A1 * | 8/2003 | Nakasendo | ..................... | 347/116 |
| 2003/0193502 A1 * | 10/2003 | Patel et al. | ...................... | 345/440 |
| 2006/0004718 A1 * | 1/2006 | McCully et al. | ................... | 707/3 |
| 2006/0136819 A1 * | 6/2006 | Tolle et al. | ..................... | 715/523 |

OTHER PUBLICATIONS

Title: Express Chart, Architecture, Technology, and Detailed Feature Specifications for the Powerful, and Versatile Java Charting Tool. Published: Quadbase Systems Inc. Nov. 2005. URL: <http://www.quadbase.com/EC_Whitepaper.pdf>.*  
Title: Express Chart User manaul, Relevant Pages: Chapter 7, pp. 1-6, Date:Mar. 12, 2005, url: <http://www.quadbase.com/espresschart/help/manual/index.html>.*  
Title: Welcom to the EspressChart Online Documentation, Date: Oct. 14, 2004, Chapters 1-12, Appendix A-C, URL: <http://www.quadbase.com/espresschart/help/manual/index.html>.*  
Title: EspressChart—Quick Start Guide, Date:Oct. 23, 2004, pp. 1-19, URL:<www.quadbase.com/espresschart/help/manual/indexsg.html>.*  
Title: ExpressChart Servlet Demo, Date: Dec. 26, 2005, pp. 1-6, URL:<http://www.quadbase.com/ECServletDemo/index.html>.*  
Lafler et al. "Quick Tip: Building Drill-Down SAS Application", Apr. 1, 2002, URL<updated EAST/WEST, US-PGPUB, USPAT, EPTO, JPO, DERWENT, IBM_TDB>.*  
Smith et al. "Creating Drill-Down Graphs Using SAS/Graph adn the Output Delivery System", Mar. 2, 2003, URL <www2.sas.com/proceedings/sugi28/149-28.pdf>.*  
International Search Report cited in related PCT Application No. PCT/US2006/046467 dated Apr. 20, 2007.  
Chinese Office Action cited in related Chinese Application No. 200680045646.5 dated Oct. 23, 2009.

* cited by examiner

*Primary Examiner* — Laurie Ries  
*Assistant Examiner* — Mustafa Amin

(57) ABSTRACT

User requested format alterations to interactive chart elements, including, but not limited to, legends, axes, gridlines, data labels, axes labels, error bars, and datapoints, whether they be represented as points, bars, pie wedges, etc., are persisted in spite of chart navigations, underlying data changes and/or format alterations. Interactive chart element format persistence is maintained by the association and storing of data identifying a format change on the data and index rule for the respective chart element.

20 Claims, 16 Drawing Sheets

PERSISTENT FORMATTING FOR INTERACTIVE CHARTS

BACKGROUND

Tables and charts are both tools that can be generated on a computer, via software programs, and used by a computer user to convey information. While both tables and charts are popular tools for storing, conveying and analyzing data, they have some generalized differences. Charts are commonly more graphic in nature, presenting data, for example, as points on a line on an x-y axis, or various bars in a bar graph. Tables, in contrast, are typically more tabular, presenting data, for example, as numbers in various rows and columns. Also, charts generally focus on data summaries and/or totals, while tables generally present more data details. Charts can graphically represent a series of data stored in a table.

Some computer-generated tables, e.g., PivotTables, are interactive data analysis tools that allow users to consolidate and analyze data from a variety of sources, including, but not limited to, Excel worksheets, relational databases, text files and OLAP cubes. Likewise, some computer-generated charts, e.g., PivotCharts, have the capability to be interactive visual data analysis tools.

Interactive charts provide a user the capability to perform a variety of interactive alterations and navigations on the presented data, which renders interactive charts analysis tools in their own right. For example, a user can filter data elements, such as datapoints, displayed in an interactive chart to a subset of the data group, or to one or more specific fields of a data set. A user can also add or remove fields of data elements from the interactive chart. Additionally, a user can navigate an interactive chart to analyze particular data fields and/or datapoints. Examples of user navigations on an interactive chart include, but are not limited to, drilling, expanding and collapsing.

An example of drilling is where a datapoint, or element, of a more general, parent, data field, e.g., food profits, is initially displayed in an interactive chart. A user can drill on this general, food profit, data field to exhibit more specific, child, datapoints, e.g., a dairy profit datapoint, a vegetable profit datapoint, and a snack item profit datapoint. In contrast, a user can collapse an interactive chart for a more generalized view of a data set. In the previous example, if datapoints for dairy profits, vegetable profits and snack item profits are currently displayed in an interactive chart, the user can collapse the chart so that all these three child datapoints are combined into, and replaced by, one more general, parent, food profit datapoint.

An interactive chart can also be expanded to display additional data fields. In the previous example, if a datapoint, or element, for a parent, food profit, data field is currently displayed in an interactive chart, the chart can be expand to also exhibit a datapoint for a second parent, food cost, data field. As another example of an expansion navigation, if datapoints for dairy profits, vegetable profits and snack item profits are currently displayed in an interactive chart, the chart can be expanded to exhibit another child, fruit profits, datapoint.

Users can also refresh the data from the underlying data source used to generate an interactive chart, whether it be a local or external data source, in order to ensure that the chart graphically depicts the most current information.

Additionally, users can alter the appearance of an interactive chart, for, e.g., aesthetic reasons. For example, an interactive chart user may want to move a chart element, such as the chart legend, from the left bottom corner to the right bottom corner of the chart, or may want to change the font or color of the legend.

All of these alterations and navigations allow for a highly flexible, interactive chart analysis tool. Various interactive chart alterations, however, can take time to accomplish, especially if the user is making many changes. If a user's formatting changes cannot be maintained upon various alterations and navigations of the interactive chart, or data refreshing, the user's efficiency is compromised. Additionally, the interactive chart is generally less effective, and it may even be abandoned, with users losing access to a flexible, interactive data analysis tool due to formatting frustrations.

SUMMARY

This summary is provided to introduce a selection of concepts in a simplified form that are further described below in the Detailed Description. This summary is not intended to identify key or essential features of the claimed subject matter, nor is it intended to be used as an aid in determining the scope of the claimed subject matter.

Embodiments discussed herein include technology that allows user requested changes to elements in an interactive chart to persist in the face of, e.g., alterations to the chart, chart navigations, and refreshment of the underlying data used to generate the chart.

In an aspect of an embodiment, a user requested visual alteration, or user override, to an interactive chart element format is persisted by direct association and storing of information for rendering the format change on the data and index rule for the interactive chart element.

BRIEF DESCRIPTION OF THE DRAWINGS

These and other features will now be described with reference to the drawings of certain embodiments and examples, which are intended to illustrate and not to limit the invention, and in which.

DETAILED DESCRIPTION

In the following description, for purposes of explanation, numerous specific details are set forth in order to provide a thorough understanding of the present invention. It will be apparent, however, to one skilled in the art that the invention may be practiced without these specific details. In other instances, well-known structures and devices are shown in block diagram form in order to avoid unnecessarily obscuring the invention.

Figure 1:
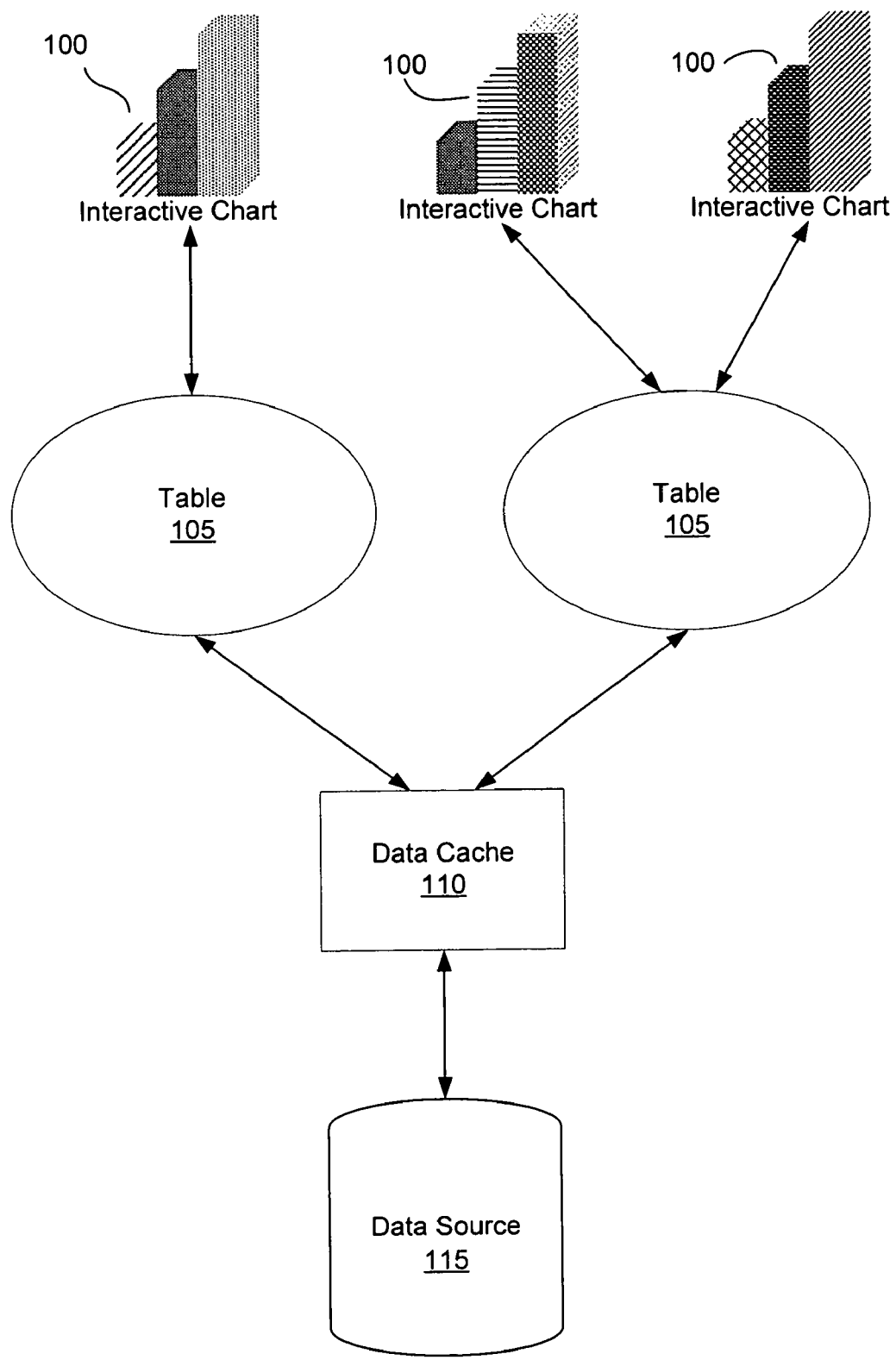
FIG. 1 is a diagram of an embodiment architecture for supporting one or more interactive charts.

Interactive charts, such as, but not limited to, PivotCharts, are highly flexible, visualization tools used to graphically display data, for concisely conveying information and for interactive data analysis. FIG. 1 is an embodiment architecture for supporting an exemplary interactive chart. One or more interactive charts 100, such as, but not limited to, PivotCharts, can be generated from a table 105, such as, but not limited to, an interactive table, e.g., a PivotTable. However, only one table 105 is associated with a specific interactive chart 100. Data graphically displayed in an interactive chart 100 is retrieved from its associated table 105.

One or more tables 105 are create from a data cache 110. The data cache 110 retrieves its data, in turn, from a data source 115.

If data in the data source 115 is altered, e.g., added to, deleted from, or changed, the relevant associated data in the data cache 110 is refreshed. In an embodiment, the associated data displayed in the respective table 105 is also refreshed. In an alternative embodiment, data in a table 105 is refreshed, as needed, only upon a user request.

In an embodiment, subsequent to data in a table 105 being refreshed, any interactive chart 100 based on this table 105 is altered as necessary to reflect the underlying changes to depicted data. In an alternative embodiment, an interactive chart 100 is altered upon any relevant refreshing of its underlying data only upon a user request.

Figure 2:
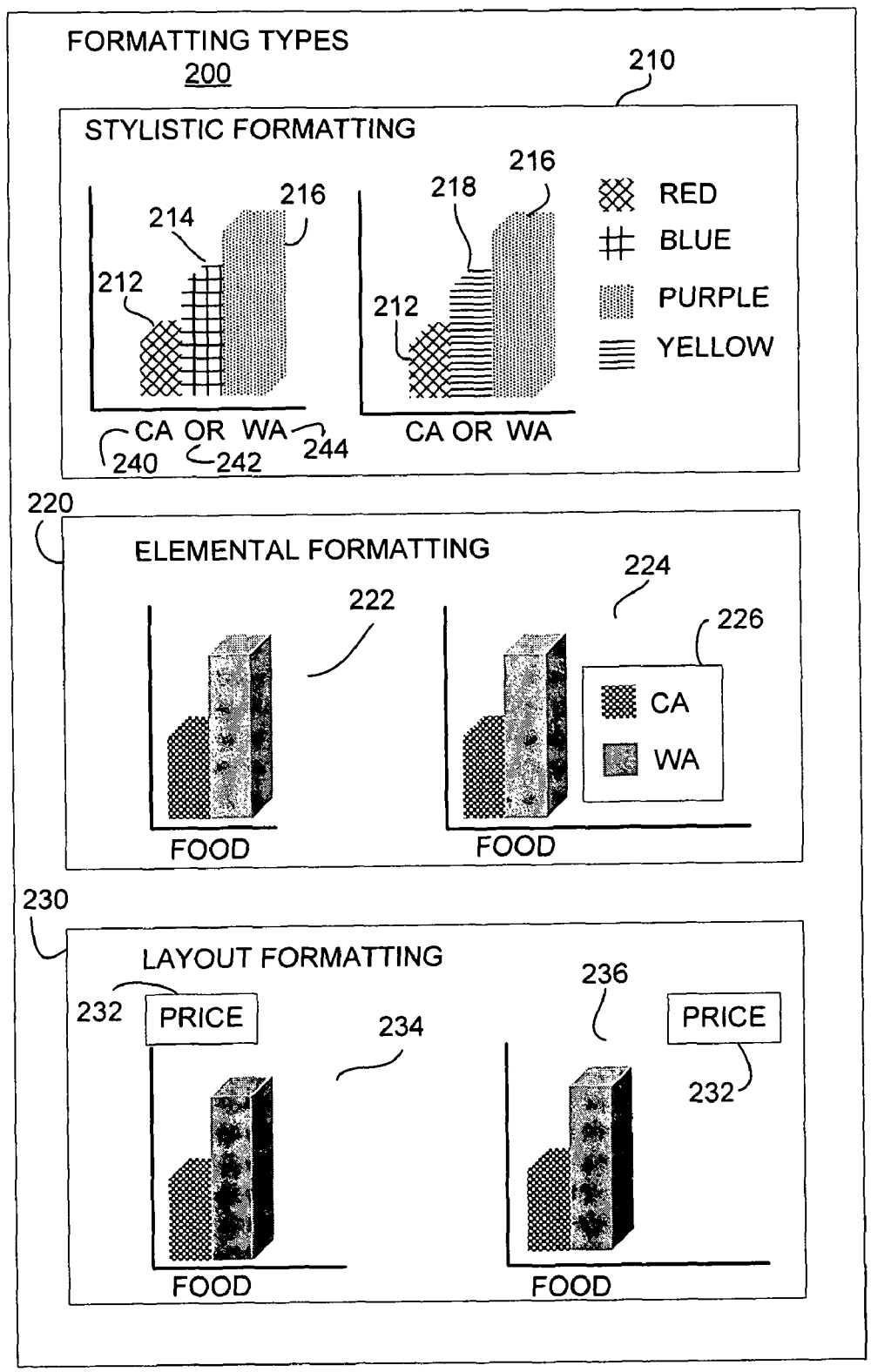
FIG. 2 is an embodiment of the formatting types available for interactive chart elements.

The various elements displayed in interactive charts can be formatted in a variety of ways, to enhance their aesthetic appeal as well as to help enable effective data analysis. Elements of any chart, including an interactive chart, include, but are not limited to, legends, labels, datapoints, trend lines, bars of a bar graph, axes, etc. FIG. 2 depicts three formatting types 200, each of which can be used to customize the look of an interactive chart 100. In other embodiments, more, less or alternative formatting types can be used to customize an interactive chart 100.

A first formatting type 200, stylistic formatting 210, refers to the application of color and/or visual effects to a chart element. For example, in rendering a stylistic formatting change, a user may request a specific datapoint be colored yellow, instead of a default blue, in order to draw attention to it, or for other aesthetic or analysis enhancing reasons.

As another example of stylistic formatting 210, an interactive chart may display three bars 212, 214 and 216, each representing a datapoint. Each of the three bars 212, 214 and 216 has an individual assigned default color. The left-most bar 212 is assigned a default color red, the middle bar 214 is assigned a default color blue, and the right-most bar 216 is assigned a default color purple 218. A user can render a stylistic format change to one of these bars, e.g., the middle bar 214, by requesting it be colored yellow, rather than the default blue. After such a request, the interactive chart displays the same datapoints, but now, while the left-most bar 212 retains its default red color and the right-most bar 216 retains its default purple color, the middle bar 218 is the user-requested yellow.

A second format type 200, elemental formatting 220, refers to the existence of elements displayed in an interactive chart. For example, adding a legend to an interactive chart is an elemental formatting alteration. The exemplary column chart 222 has no depicted legend, while, upon a user request, the column chart 224, displaying the same datapoints as the column chart 222, additionally exhibits a legend 226.

A third format type 200, layout formatting 230, refers to the placement of elements already displayed in an interactive chart. For example, a user may render a layout format alteration by requesting a chart legend element 232 be relocated from the top left of the chart 234 to the top right of the chart 236.

In an embodiment, user requested visual alterations, or user overrides, based on each of these three format types 200 are persisted in an interactive chart 100.

In the previous examples, visual alterations to an interactive chart, whether they are based on stylistic formatting 210, elemental formatting 220, layout formatting 230, or any combination thereof, cause the current interactive chart to change. Upon any format change, or any navigation of an interactive chart, the interactive chart is still the same chart, but its view has been altered to display something more, something less, or something different.

In an embodiment, default formatting is applied to elements of an interactive chart until, and unless, a user requests a specific format alteration for a chart element. Series formatting herein refers to formatting applied to a data series by default. A data series is a category of data. An example of a data series is the CA (California) data series 240 shown in FIG. 2. Other exemplary data series displayed in FIG. 2 are the OR (Oregon) data series 242 and the WA (Washington) data series 244. In an embodiment the series, default, formatting is subject to the chart's style, type and overall stylistic theme.

In an embodiment, with the goal to maximize the color differentiation between displayed data series, default stylistic formatting color assignments have no relation to a specific data series in the interactive chart. In this embodiment, default color assignments are calculated based on color transformations within a specific interactive chart style. Thus, in an embodiment, regardless of alterations to the underlying data supporting the interactive chart, or various chart navigations, e.g., drills, collapses or expansions, the default colors assigned for stylistic formatting are not persisted. Thus, in an embodiment, data series displayed in an interactive chart with default stylistic formatting can change upon various chart navigations to maintain the chart's aesthetics.

Figure 3A:
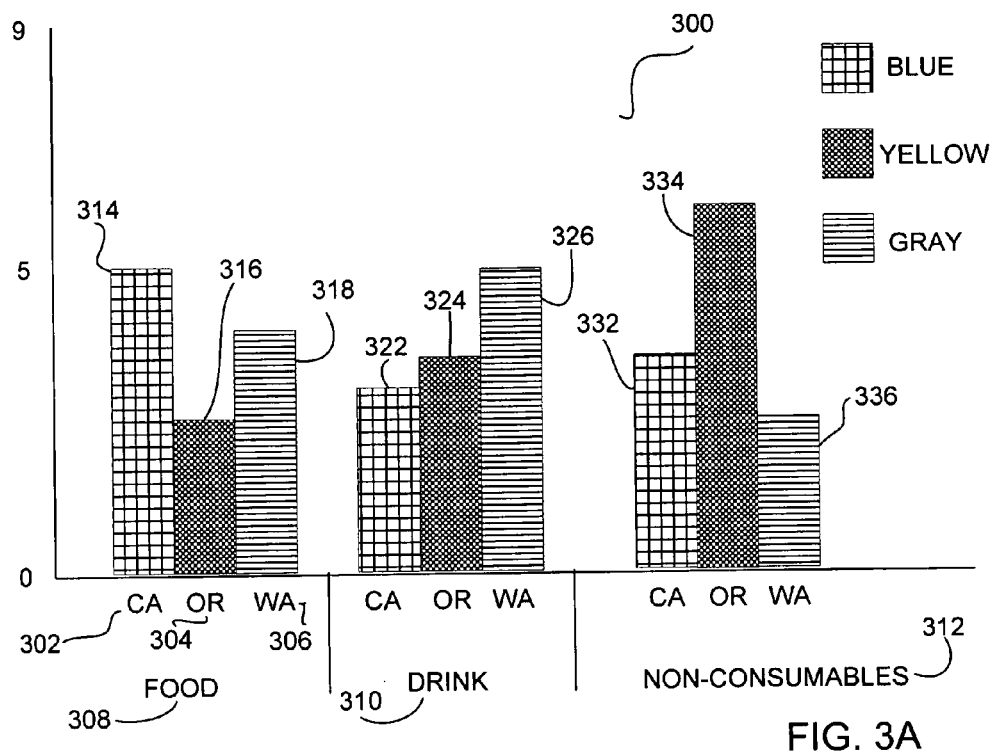
FIG. 3A depicts an exemplary interactive chart with default stylistic formatting.

Referring to FIG. 3A, an exemplary interactive column chart 300 displays default stylistic formatting for the datapoints, or elements, for three state series, CA (California) 302, OR (Oregon) 304 and WA (Washington) 306, for each of three data fields, food 308, drink 310 and non-consumables 312. In an embodiment, default color assignments are made for the elements of each data series, 302, 304 and 306, by a calculation with beginning and end points designed to maximize the differentiation between the series 302, 304 and 306. Color assignments for stylistic formatting for elements of the various data series 302, 304 and 306 are based on the respective series' index. In the exemplary interactive column chart 300, the datapoints 314, 322 and 332 for the CA state series 302 are a default blue color, the OR state series 304 datapoints 316, 324 and 334 are a default yellow color, and the WA state series 306 datapoints 318, 326 and 336 are a default gray color.

Figure 3B:
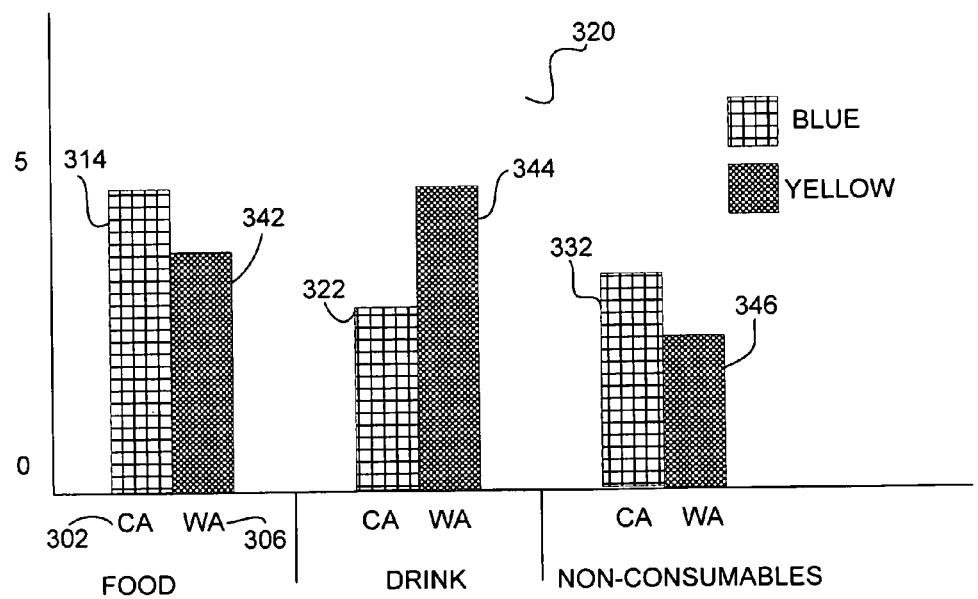
FIG. 3B depicts an example of a collapse of the interactive chart of FIG. 3A.

The interactive chart 320 of FIG. 3B is an exemplary collapse of the interactive chart 300 of FIG. 3A. In this example, the OR state series 304 is filtered out, i.e., the OR state datapoints are not displayed in the current view of the interactive chart of FIG. 3B. In this embodiment, default stylistic format color assignments are not persisted. Thus, while the datapoints 314, 322 and 332 of the CA state series 302 of interactive chart 320 maintain their original default blue color from interactive chart 300, the datapoints 342, 344 and 346 of the WA state series 306 of interactive chart 320 have been re-assigned the default yellow color. In an embodiment, this default format reassignment is performed to maximize the differentiation between the two remaining displayed series 302 and 306.

Persistent formatting, i.e., format retention, supports the maintenance of user requested, or user override, format alterations to various interactive chart elements during chart navigations and when the underlying data supporting the chart is changed in any way, e.g., added to, deleted from, or modified. In an embodiment, all three format types 200, i.e., stylistic formatting 210, elemental formatting 220 and layout formatting 230, are persisted. Users of interactive charts can apply custom formatting on a per interactive chart basis. In an embodiment, as there is the possibility of more than one interactive chart 100 for a table 105, each interactive chart 100 retains its user requested, custom, formatting independent of the other interactive charts 100 based on the same table 105.

Figure 4A:
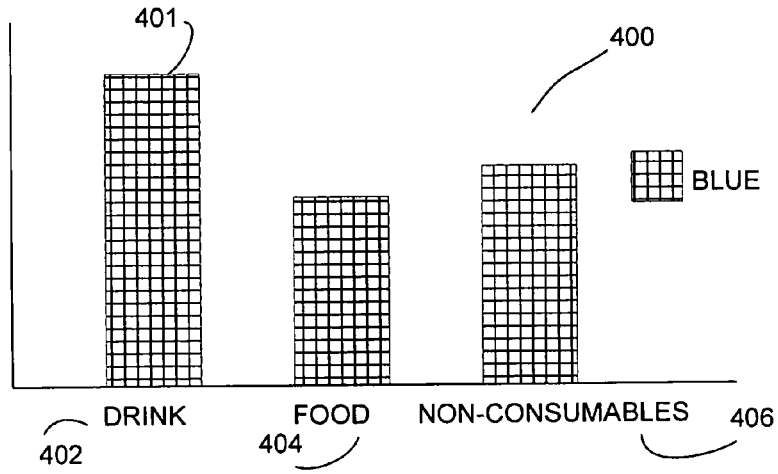
FIG. 4A depicts an exemplary interactive chart with default stylistic formatting.
Figure 4B:
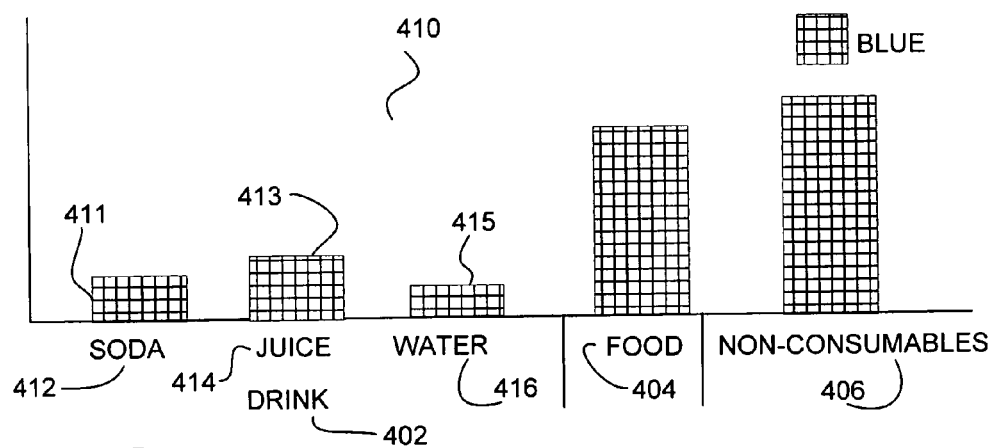
FIG. 4B depicts an example of a drill of the interactive chart of FIG. 4A to reveal child elements of a parent element displayed in the interactive chart of FIG. 4A.
Figure 4C:
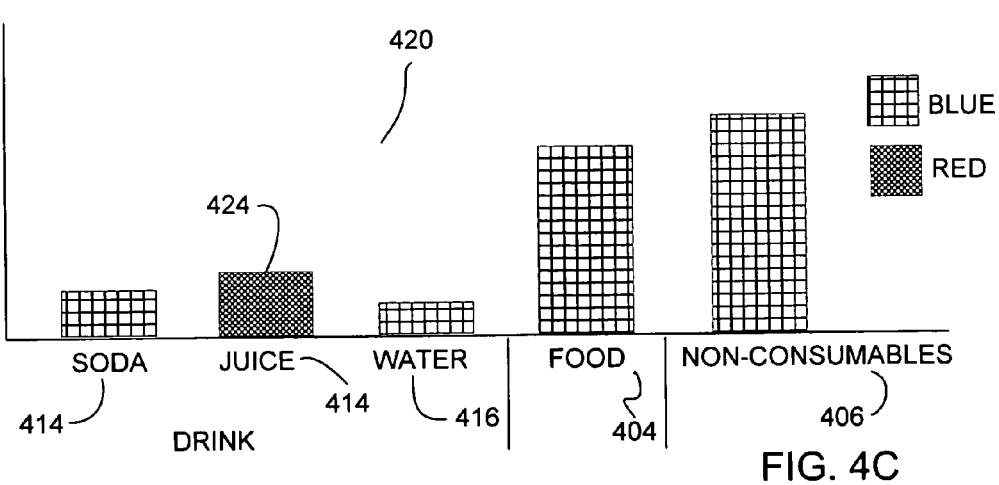
FIG. 4C depicts an example of a user override stylistic format change to a child element of the interactive chart of FIG. 4B.

FIGS. 4A, 4B and 4C are exemplary interactive column charts, i.e., alternative views of an interactive column chart, wherein persistent formatting is maintained for a user override stylistic format alteration. Each of the charts 400, 410 and 420 display profit datapoints for various consumer products purchased in the United States (USA). In FIG. 4A, exemplary interactive column chart 400 displays datapoints for a USA profit data series, with a default assigned blue color, for three data fields, drink 402, food 404 and non-consumables 406. The interactive column chart 410 of FIG. 4B is the result of a drill on the interactive column chart 400, wherein the drink data field 402 is replaced by three child data fields, soda 412, juice 414 and water 416. In an embodiment, as the datapoint 401 for the parent drink field 402 is a default blue color, and there has been no user override format change to this data field 402, each of the datapoints 411, 413 and 415 for the child data fields 412, 414 and 416 are also assigned the default blue color.

In an embodiment, the basic rule for applying default stylistic formatting to a parent datapoint, or element, of an interactive chart is:
If (parent displayed in chart) AND (format is DEFAULT) Parent format=DEFAULT Format In an embodiment, the basic rule for applying default stylistic formatting to a child datapoint, or element, of an interactive chart is that the child element is assigned the same stylistic formatting as its parent element:
If (child displayed in chart) AND (format is DEFAULT) Child Format=Parent Format=DEFAULT Format Referring to FIG. 4C, interactive column chart 420 displays the same datapoints as interactive column chart 410 of FIG. 4B, but with a user override stylistic format alteration to a child data field. Specifically, in the interactive column chart 410 of FIG. 4B, the datapoint 413 for the child juice data field 414 is a default blue color. In the interactive column chart 420 of FIG. 4C, however, the datapoint 424 for the child juice data field 414 is now a custom format red color, pursuant to a user override stylistic format change request. The remaining displayed datapoints, for both parent and child data fields, retain their default blue color in interactive column chart 420.

In an embodiment, the basic rule for applying a user override stylistic format alteration to a child datapoint, or element, of an interactive chart is:
If (child displayed in chart) AND (format is USER OVERRIDE) Child Format=USER OVERRIDE Format In an embodiment, data identifying a user override stylistic format change is directly associated with and stored on the data tuple and index rule for the associated chart element. For the exemplary interactive column chart 420, data identifying the user requested stylistic format color change to the juice data field 414 is stored with the data tuple for its datapoint 424 in the formatting array for the interactive column chart 420:
<Drink-Juice><USA><Profit>=RED If there is a subsequent collapse of the interactive column chart 420, so that the parent drink data field 402 is again displayed in place of its child data fields, the interactive column chart 400 of FIG. 4A is once more displayed. In this example, as a user did not request a stylistic format alteration for the parent drink data field 402, its datapoint 401 is re-displayed with its original assigned default blue color. If, sometime after the collapse of interactive column chart 420 of FIG. 4C to interactive column chart 400 of FIG. 4A, interactive chart 400 is once more drilled to re-display the three child data fields, soda 412, juice 414 and water 416, the user override formatting persists. Thus, the datapoint 424 for the child juice data field 414 is re-displayed with the user override red color, as shown in the interactive column chart 420 of FIG. 4C. As the user did not request any stylistic format changes to the other child data fields, soda 412 and water 416, or the remaining displayed parent data fields, food 404 and non-consumables 406, each of these fields' datapoints are displayed with their originally assigned default blue color.

In an embodiment, if the underlying data source for the datapoints, or elements, displayed in the interactive chart 420 is altered, e.g., but not limited to, added to, deleted from, refreshed, or updated, datapoint 424 for the child juice data field 414 remains displayed with its currently assigned user override red color.

Figure 5A:
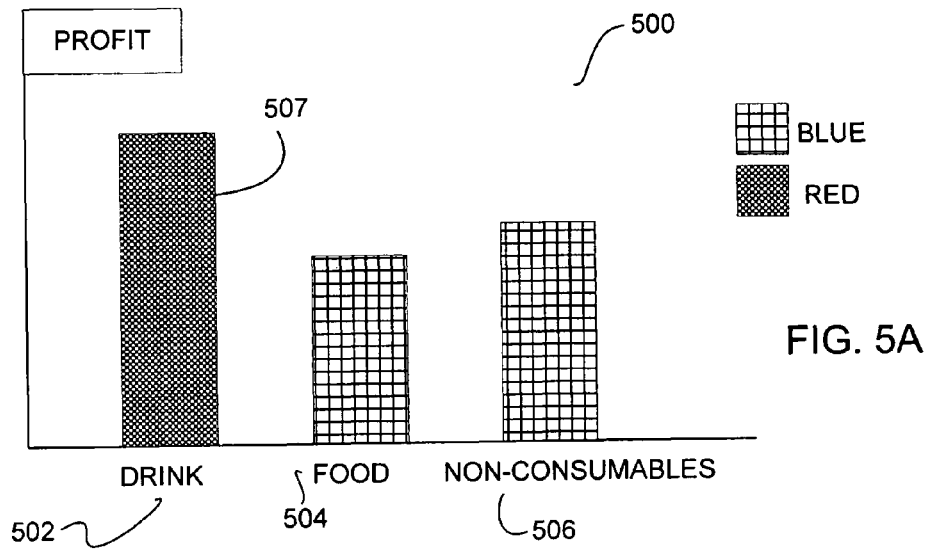
FIG. 5A depicts an example of a user override stylistic format change for a parent element of an interactive chart.
Figure 5B:
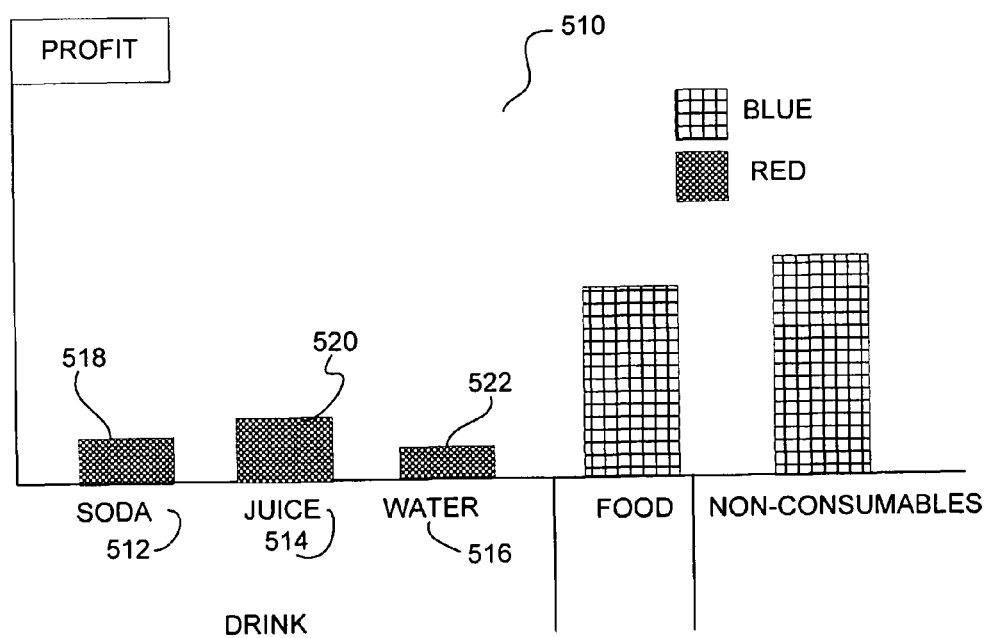
FIG. 5B depicts an example of a drill of the interactive chart of FIG. 5A to reveal child elements of a parent element displayed in the interactive chart of FIG. 5A.

FIGS. 5A and 5B are additional exemplary interactive column charts, i.e., alternative views of an interactive column chart, wherein persistent formatting is maintained for a user override stylistic format alteration. Both the interactive column chart 500 of FIG. 5A and the interactive column chart 510 of FIG. 5B display profit datapoints for various consumer products purchased in the United States (USA). In FIG. 5A, exemplary interactive chart 500 displays datapoints for a USA profit data series for three data fields, wherein two of the data fields, food 504 and non-consumables 506, are a default-assigned blue color, and one data field, drink 502, is a user override red color.

In an embodiment, the basic rule for applying user override stylistic formatting to a parent datapoint, or element, of an interactive chart is:

If (parent displayed in chart) AND (format is USER OVERRIDE) Parent format=USER OVERRIDE Format As previously discussed, in an embodiment, data identifying a user override stylistic format change is directly associated with and stored on the data tuple and index rule for the associated chart element. For the exemplary interactive column chart 500, data identifying the user override stylistic format color change to the drink data field 502 is stored with the data tuple for its datapoint 507 in the formatting array for the interactive chart 500:

<Drink><USA><Profit>=RED

The interactive column chart 510 of FIG. 5B is the result of a drill on the interactive column chart 500 of FIG. 5A, wherein the drink data field 502 is replaced with three child data fields, soda 512, juice 514 and water 516. In an embodiment, as the datapoint 507 for the parent drink data field 502 of FIG. 5A is a user override red color, and there has been no user requested format changes to any of the three child data fields 512, 514 or 516, the datapoints 518, 520 and 522 for each of these respective child data fields are also the user override red color.

In an embodiment, the basic rule for applying default stylistic formatting to a child datapoint, or element, of an interactive chart is that the child element is assigned the same stylistic formatting as the parent element:

If (child displayed in chart) AND (format is USER OVERRIDE) Child Format=Parent Format=USER OVERRIDE Format Thus, in this embodiment, the default stylistic formatting for a child data field may not be the original default stylistic formatting originally assigned its parent data field, but may instead be a user override stylistic format alteration applied to the parent prior to the display of the child datapoints in the interactive chart.

Figure 6A:
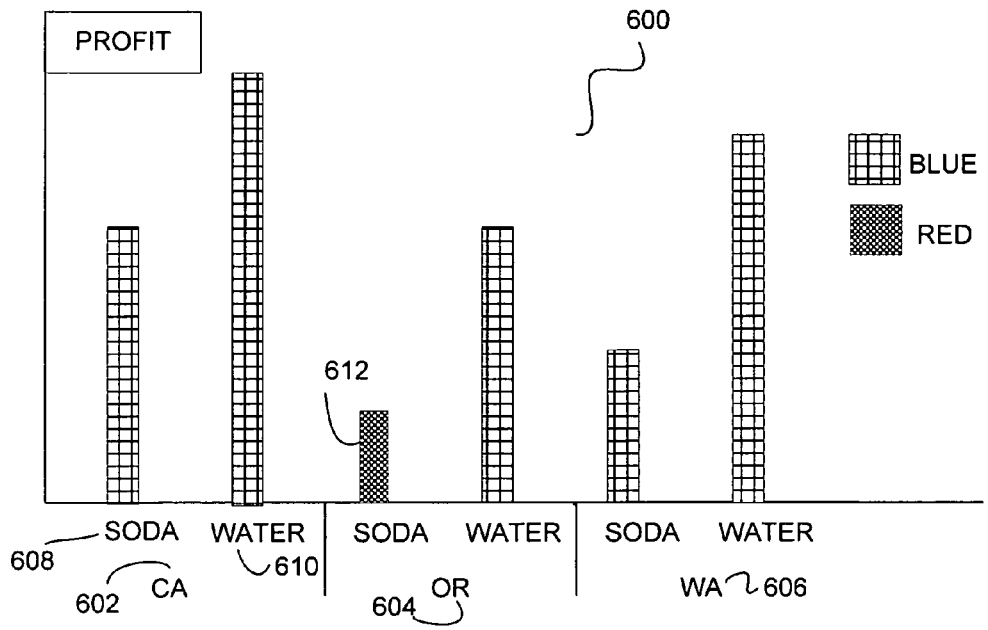
FIG. 6A depicts an example of a user override stylistic format change for a child element of an interactive chart.
Figure 6B:
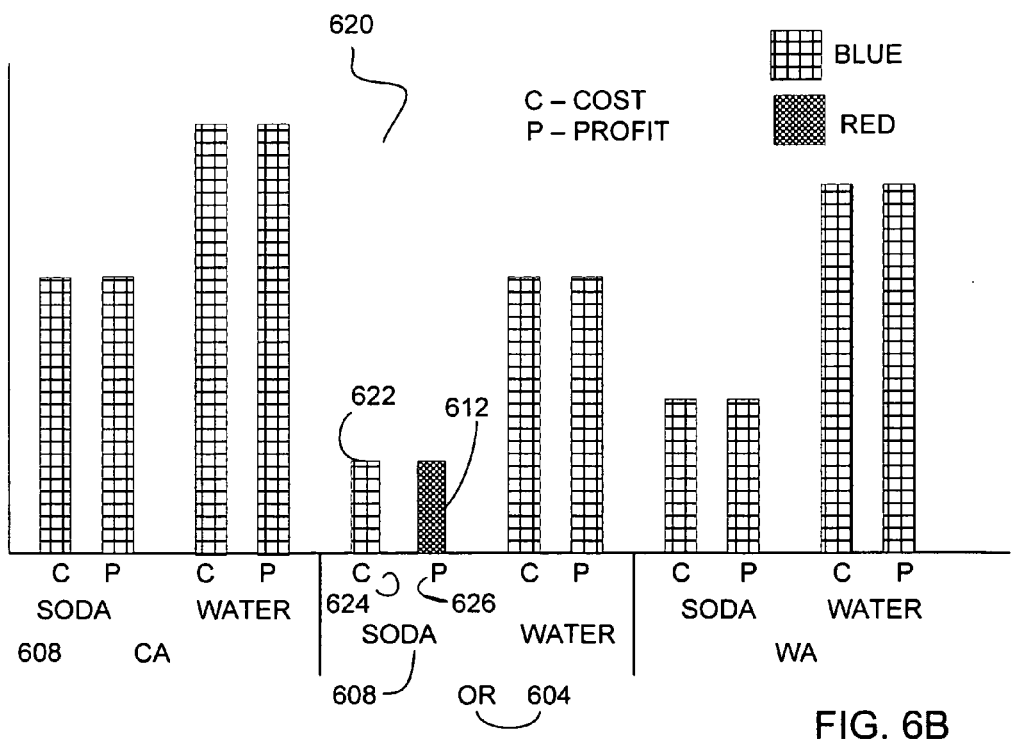
FIG. 6B depicts an example of an expansions of the interactive chart of FIG. 6A to display additional child elements.

For the exemplary interactive column chart 510, data identifying the user override stylistic format red color applied to the child data fields soda 512, juice 514 and water 516 is stored with the data tuple for their respective datapoints 518, 520 and 522 in the formatting array for the interactive chart 510:

<Drink-Soda><USA><Profit>=RED
    <Drink-Juice><USA><Profit>=RED
    <Drink-Water><USA><Profit>=RED FIGS. 6A and 6B are also exemplary interactive column charts, i.e., alternative views of an interactive column chart, where persistent formatting is maintained for a user override stylistic format alteration. Interactive column chart 600 displays USA profit datapoints for three state series, California (CA) 602, Oregon (OR) 604 and Washington (WA) 606, and two drink data fields, soda 608 and water 610. In FIG. 6A, all displayed datapoints are a default-assigned blue color except datapoint 612 for the OR state series 604, soda data field 608, which is a user override red color. Data identifying the user override stylistic format red color is stored with the data tuple for the datapoint 612:

<Drink-Soda><OR><USA><Profit>=RED

Interactive column chart 620 of FIG. 6B is the result of the inclusion of an additional value field, i.e., the inclusion of an additional data field for the same displayed data sources, i.e., data series CA 602, OR 604 and WA 606 and data fields soda 608 and water 610, of interactive column chart 600 of FIG. 6A. In this example, additional datapoints, for cost, are displayed in the interactive chart 620 of FIG. 6B, along with the original profit datapoints displayed in the interactive chart 600 of FIG. 6A. The cost data field 624 is not a child of the pre-existing profit data field 626, but rather a sibling. Thus, the cost datapoint 622 for the Oregon state series 604, soda data field 608 does not adopt the user override stylistic format red color applied to the profit datapoint 612 for the same Oregon state series 604, soda data field 608. Rather, the Oregon soda cost datapoint 622 is assigned the default blue color, which is the original default color assigned datapoints for the Oregon state series 604 drink data fields. The addition of the cost datapoints to the interactive chart 620, however, does not alter the user override stylistic format red color assigned the Oregon soda profit datapoint 612.

Figure 7A:
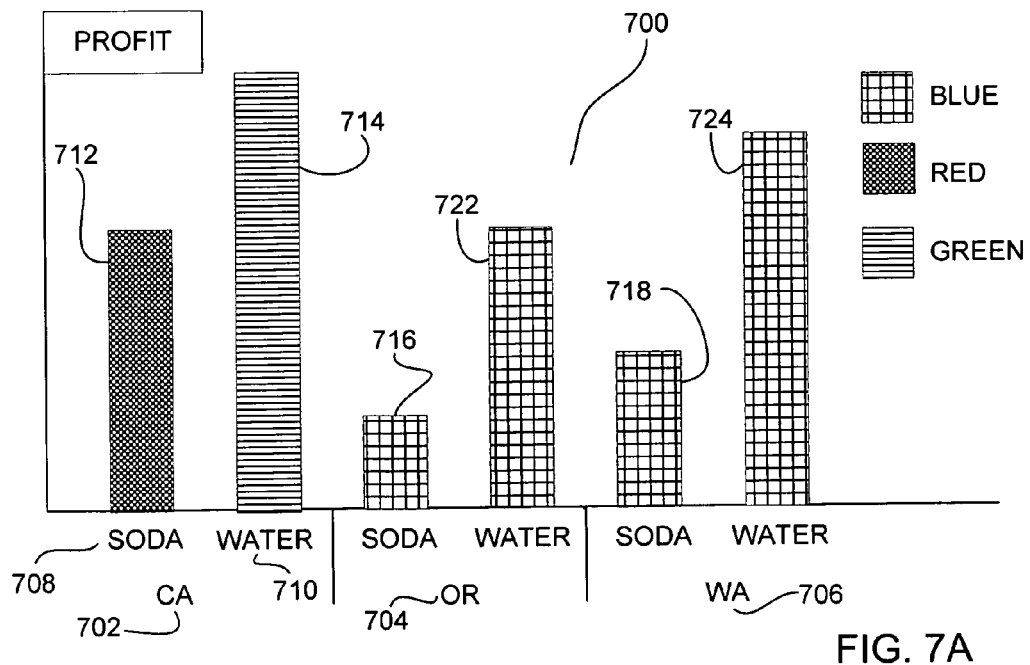
FIG. 7A depicts an example of a user override stylistic format change to two child elements of an interactive chart.
Figure 7B:
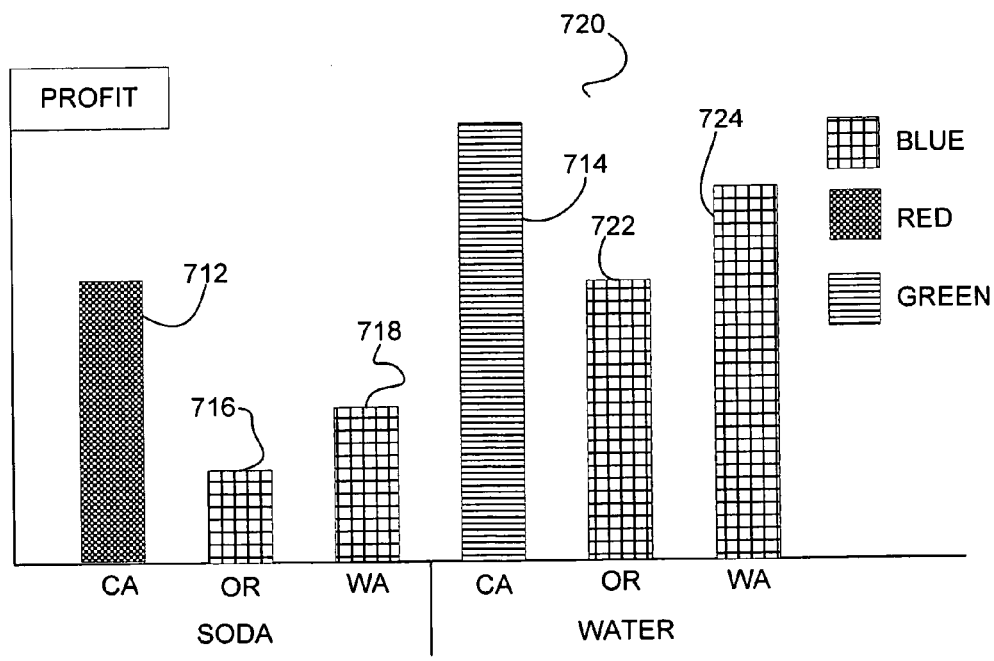
FIG. 7B depicts an example of a re-ordering of the elements displayed in the interactive chart of FIG. 7A.

FIGS. 7A and 7B are interactive column charts, i.e., alternative views of an interactive column chart, where persistent formatting is maintained when the chart datapoints, or elements, are re-ordered. Interactive column chart 700 of FIG. 7A displays USA profit datapoints for three state series, California (CA) 702, Oregon (OR) 704 and Washington (WA) 706, each with two drink data fields, soda 708 and water 710. In FIG. 7A, all displayed datapoints are a default-assigned blue color, except the datapoints 712 and 714 for the California state series 702. The California soda profit datapoint 712 is a user override stylistic format red color, and the California water profit datapoint 714 is a user override stylistic format green color. Data identifying these user override stylistic formats is stored with the respective data tuples for the California datapoints 712 and 714:

<Drink-Soda><CA><USA><Profit>=RED
    <Drink-Water><CA><USA><Profit>=GREEN

Interactive column chart 720 of FIG. 7B is the result of a re-ordering of the datapoints, or elements, of the interactive column chart 700 of FIG. 7A. In the interactive column chart 700, the datapoints are ordered by state, and then by drink. In contrast, in the interactive column chart 720 of FIG. 7B, the datapoints are ordered by drink, and then by state. In an embodiment, with persistent formatting for interactive charts, when displayed datapoints are re-ordered, they retain the stylistic formatting assigned to them prior to the re-order. Thus, in interactive column chart 720 the Oregon and Washington drink (both soda and water) profit datapoints 716, 718, 722 and 724 retain their default-assigned blue color, the California soda profit datapoint 712 retains its user override red color, and the California water profit datapoint 714 retains its user override green color.

FIGS. 8A, 8B, 8C, 8D and 8E are interactive column charts, i.e., alternative views of an interactive column chart, where persistent formatting is maintained when user override stylistic formatting is applied to a child datapoint, or element, and then subsequently to various parent datapoints, or elements. Interactive column chart 800 of FIG. 8A displays profit datapoints for a USA series for each of a drink data field 802, a food data field 804 and a non-consumables data field 806. In this example, each of the displayed datapoints, or elements, 803, 805 and 807 of the USA series are a default-assigned blue color.

Figure 8A:
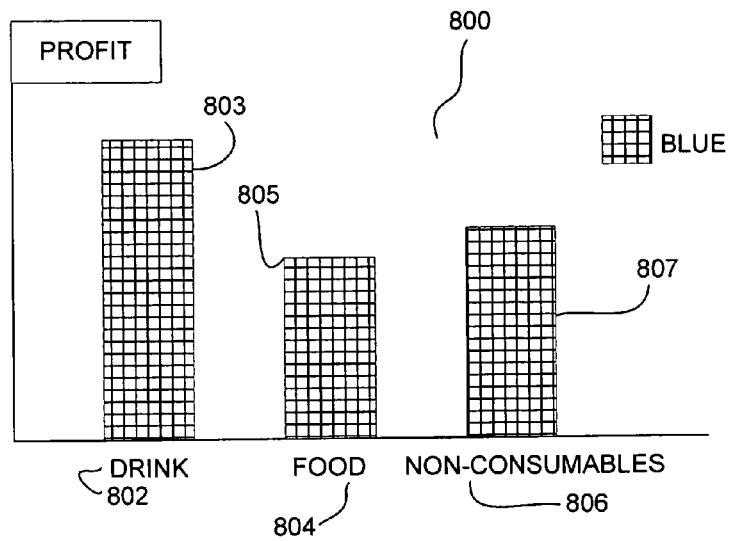
FIG. 8A depicts an exemplary interactive chart with default stylistic formatting.
Figure 8B:
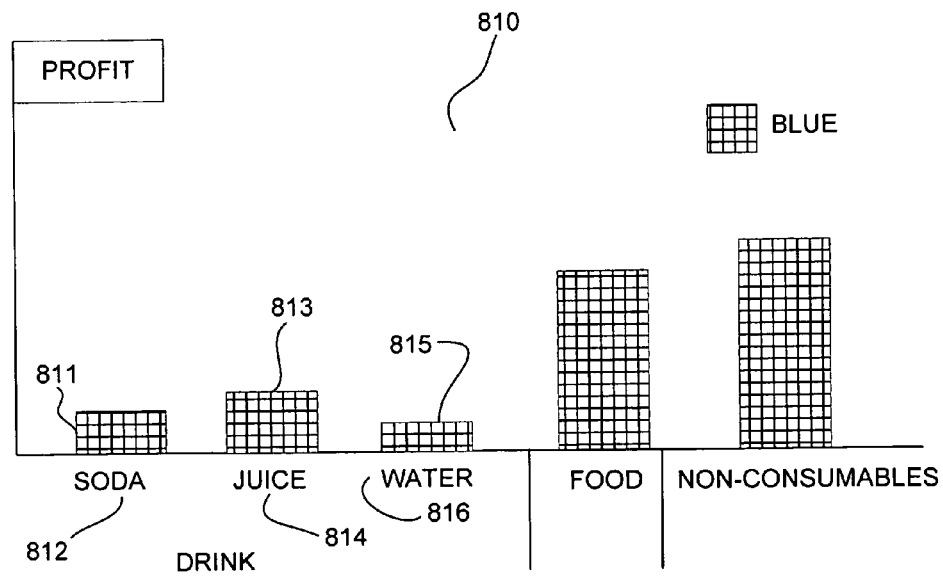
FIG. 8B depicts an example of a drill of the interactive chart of FIG. 8A to exhibit child elements of a parent element displayed in the interactive chart of FIG. 8A.

Interactive column chart 810 of FIG. 8B is the result of a drill of the interactive column chart 800, where the parent drink data field 802 of FIG. 8A is replaced by child data fields, soda 812, juice 814 and water 816. As the datapoint 803 for the parent drink data field 802 is a default-assigned blue color, and there has been no user override stylistic format request, the datapoints 811, 813 and 815 for the respective child data fields 812, 814 and 816 of the interactive chart 810 are all also assigned the default blue color.

Figure 8C:
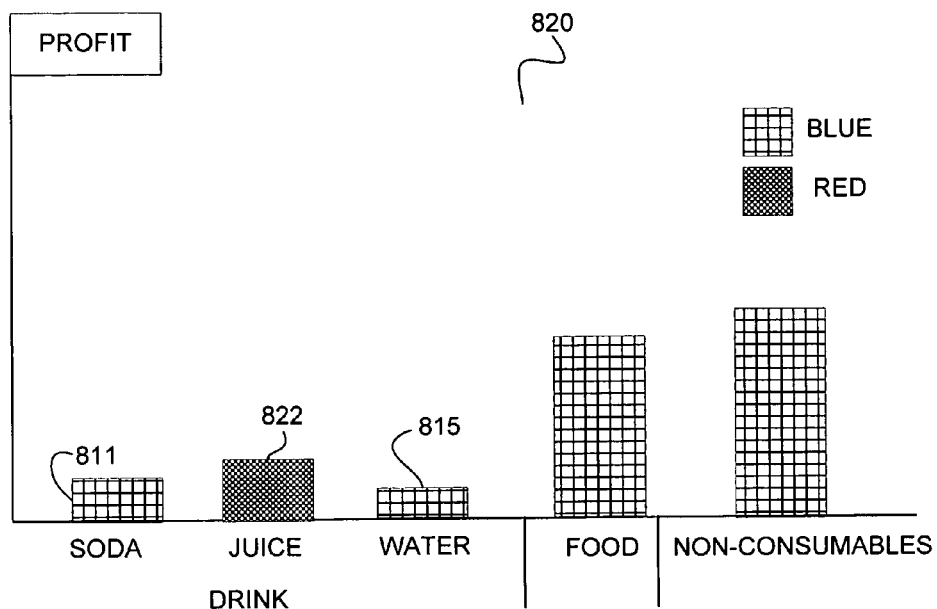
FIG. 8C depicts an example of a user override stylistic format change to a child element displayed in the interactive chart of FIG. 8B.

The interactive column chart 820 of FIG. 8C displays the same datapoints as the interactive chart of FIG. 8B, except in the interactive chart 820 the child juice profit datapoint 822 is now red, pursuant to a user override stylistic format change request. Data identifying the user override red color is stored with the data tuple for the juice profit datapoint, or element, 822:

<Drink-Juice><USA><Profit>=RED

Figure 8D:
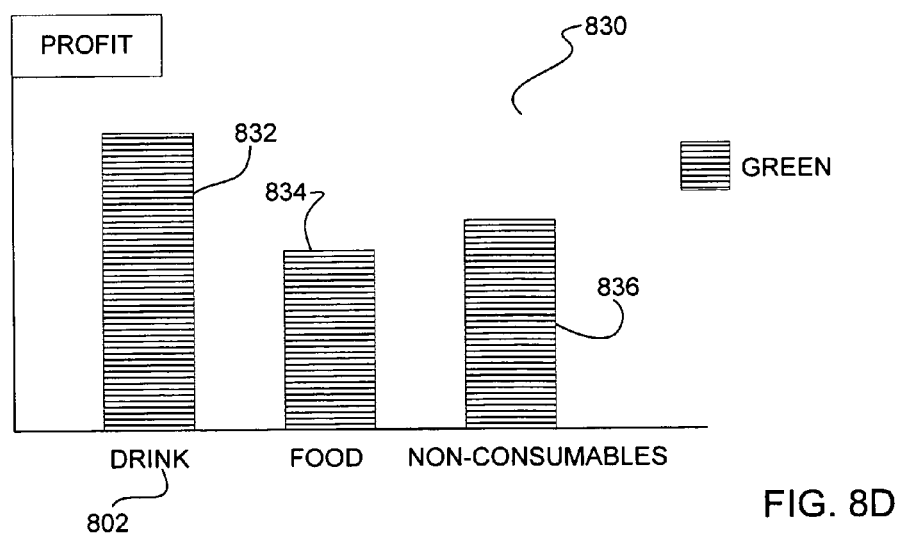
FIG. 8D depicts an example of a collapse of the interactive chart of FIG. 8C to display the parent elements initially exhibited in the interactive chart of FIG. 8A, and in which a user override stylistic format alteration is made to these parent elements.
Figure 8E:
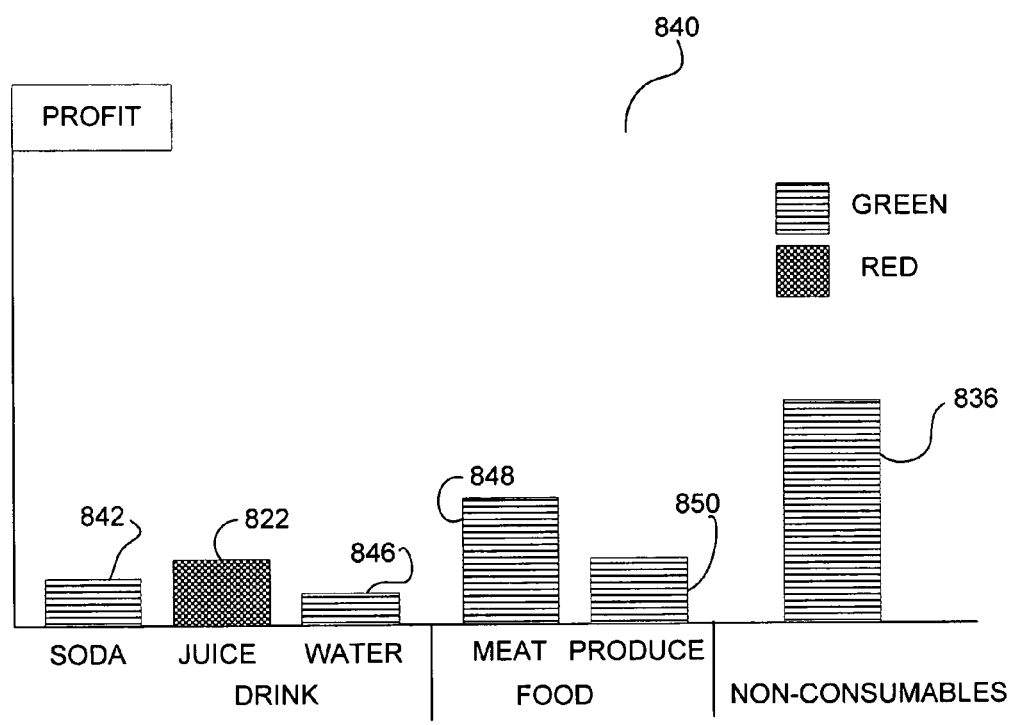
FIG. 8E depicts an example of a drill of the interactive chart of FIG. 8D to display the same child elements exhibited in the interactive chart of FIG. 8C.

In FIG. 8D, the interactive column chart 830 is the result of a collapse of the interactive column chart 820 of FIG. 8C, where the profit datapoint 832 for the parent drink data field 802 is displayed in place of the respective child datapoints 811 (soda profit), 822 (juice profit) and 815 (water profit). Additionally, in the interactive column chart 830, there has been a series level formatting user override, so that each of the displayed datapoints, 832 (drink profit), 834 (food profit) and 836 (non-consumables profit), of the USA series is now a user override stylistic format green color. Data identifying the user override stylistic format alteration for the datapoints, or elements, 832, 834 and 836 of the USA series is stored with the respective data tuple for each datapoint:

<Drink><USA><Profit>=GREEN
<Food><USA><Profit>=GREEN
<Non-Consumables><USA><Profit>=GREEN The interactive column chart 840 of FIG. 8E is the result of a subsequent drill of the interactive column chart 830 of FIG. 8D. In the interactive chart 840, child datapoints 842 (soda profit), 822 (juice profit) and 846 (water profit) replace the parent drink profit datapoint 832 of the interactive chart 830. Additionally, in the interactive chart 840, child datapoints 848 (meat profit) and 850 (produce profit) replace the parent food profit datapoint 834 of the interactive chart 830. In this example, the parent non-consumables profit datapoint 836 remains displayed in the interactive chart 840 as it was in the interactive chart 830, i.e., with the user override green color.

As the child juice profit datapoint 822 was previously assigned a user override red color, it retains this red color when it is re-displayed in the interactive column chart 840. The child soda profit datapoint 842 and the child water profit datapoint 846 continue to adopt the stylistic format of their parent, drink profit, datapoint 832 as there has been no user override change request for either of these. As previously discussed, in an embodiment the basic rule for applying default stylistic formatting to a child datapoint, or element, of an interactive chart is that the child element is assigned the same stylistic formatting as its parent datapoint, or element:

If (child displayed in chart) AND (format is USER OVERRIDE) Child Format=Parent Format=USER OVERRIDE Format Thus, in the present example, the child soda profit datapoint 842 and the child water profit datapoint 846 are each colored green, the user series override stylistic format color applied to their parent, drink profit, datapoint 832 in the interactive chart 830. Data identifying the user override stylistic format alteration applied to the datapoints 842 and 846 now displayed in the interactive chart 840 is stored with their respective data tuples:

<Drink-Soda><USA><Profit>=GREEN
<Drink-Water><USA><Profit>=GREEN In an embodiment, data identifying a user override format change is stored with the respective data tuple for a chart element that assumes the format change when that chart element is first displayed in the interactive chart. Thus, in the present example, data identifying the stylistic format green color for the child soda profit datapoint 842 and the child water profit datapoint 846 is stored with their respective data tuples when these datapoints 842 and 846 are first displayed, in the interactive chart 840. In this embodiment, data identifying the stylistic format green color for each of these child datapoints 842 and 846 is not stored with their respective data tuples when the user requested this stylistic format change for the USA series as these child datapoints 842 and 846 were not displayed in the interactive chart 830 at that time.

In an alternative embodiment, data identifying a user override format change is stored with the respective data tuple for a chart element that assumes the format change when the user first makes the format change request. Thus, in this alternative embodiment, and referring to the exemplary interactive column chart 840, data identifying the stylistic format color green for the child soda profit datapoint 842 and the child water profit datapoint 846 is stored with their respective data tuples when the user makes this format change request for the USA series.

Figure 9A:
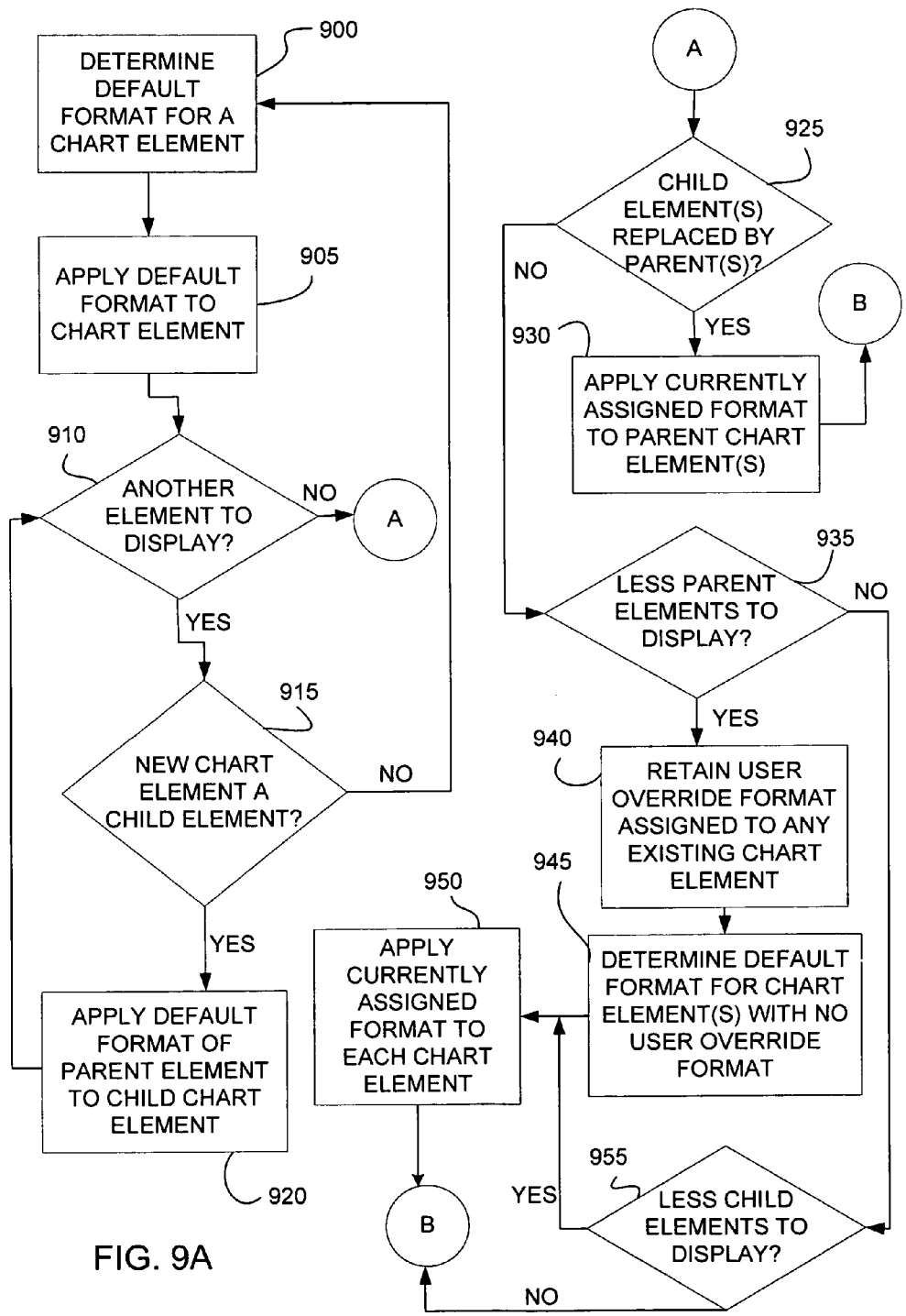
FIGS. 9A, 9B and 9C illustrate an embodiment of a logic flow for enabling persistent stylistic user formatting for elements of an interactive chart.
Figure 9B:
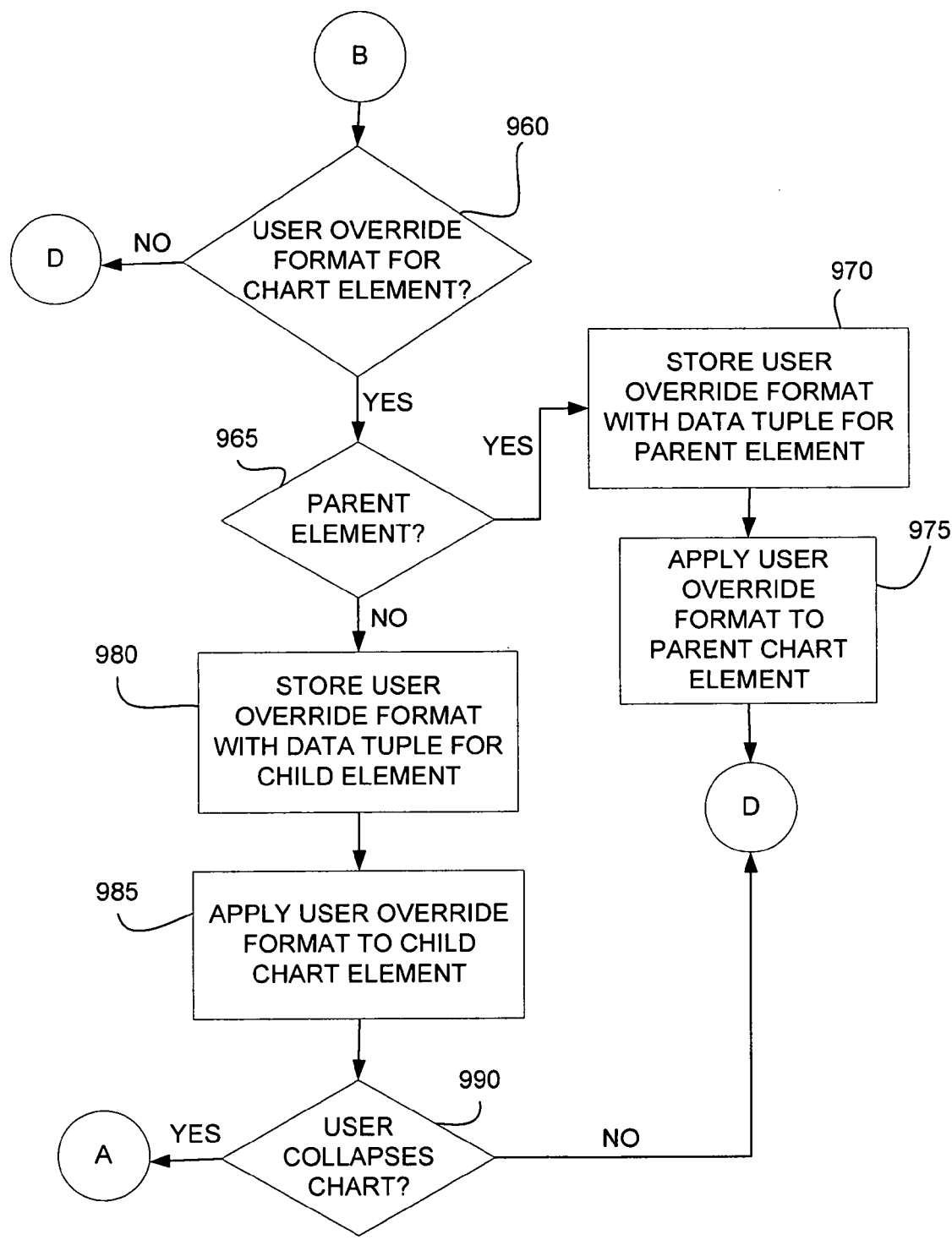
Figure 9C:
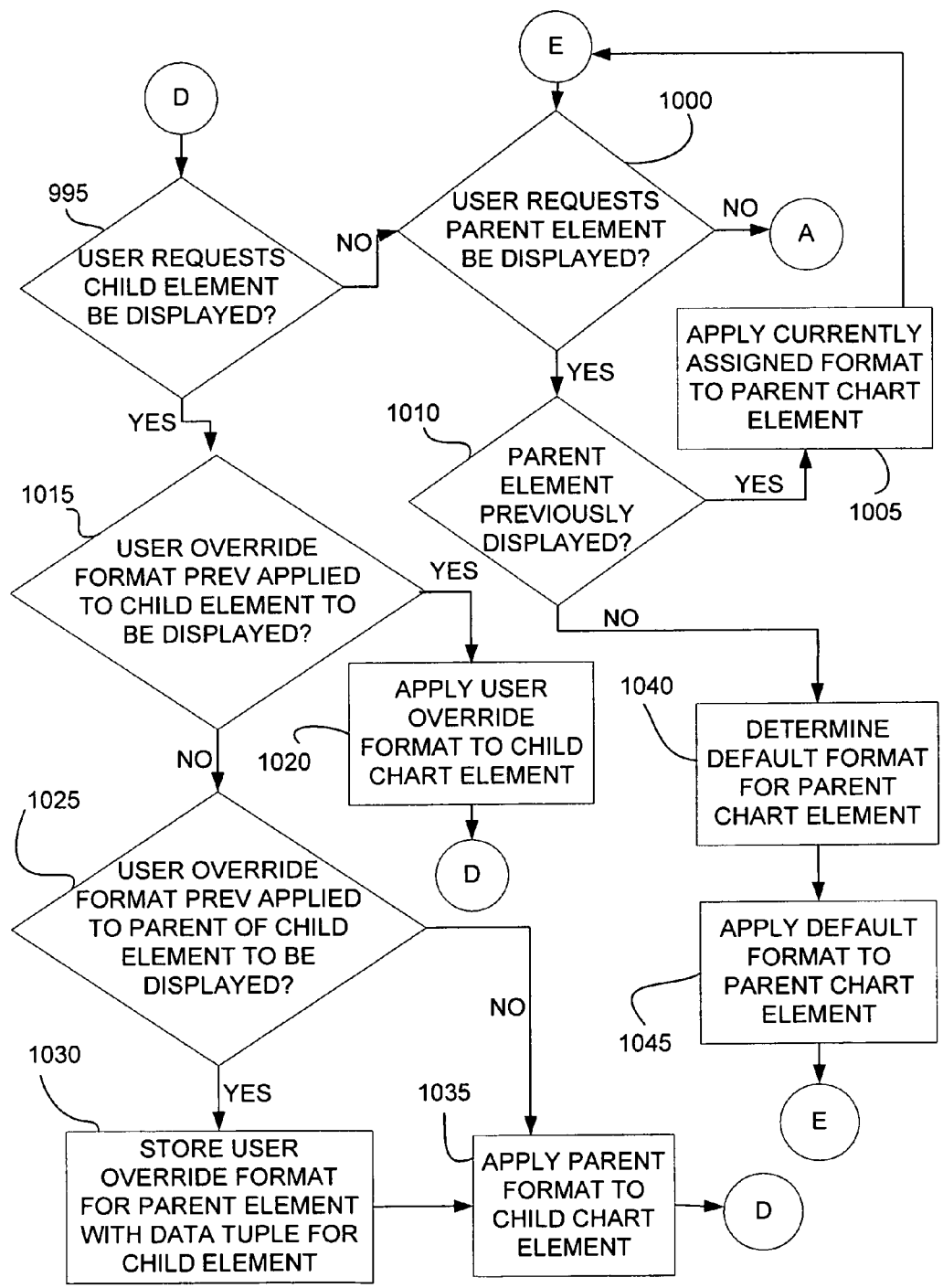

Referring again to the interactive column chart 840 of FIG. 8E, the child meat profit datapoint 848 and the child produce profit datapoint 850 assume the stylistic format of their parent, food profit, datapoint 834 of the interactive chart 830, as there has been no user override change request for either of these. In an embodiment, the basic rule for applying default stylistic formatting to a child datapoint, or element, of an interactive chart is that the child element is assigned the same stylistic formatting as its parent element. Data identifying the user override green color applied to the child datapoints 848 and 850 now displayed in the interactive column chart 840 is stored with their respective data tuples:

<Food-Meat><USA><Profit>=GREEN
<Food-Produce><USA><Profit>=GREEN FIGS. 9A, 9B and 9C illustrate an embodiment logic flow for a methodology for maintaining persistent user override stylistic format alterations for interactive chart elements, or datapoints. While the following discussion is made with respect to systems described herein, the operations described may be implemented in other systems. Further, the operations described herein are not limited to the order shown. Additionally, in other alternative embodiments more or fewer operations may be performed.

When a chart element is to be displayed in an interactive chart, a default stylistic format is determined for the chart element 900. This default format is applied to the chart element as it is displayed in the interactive chart 905. At decision block 910, a determination is made as to whether another chart element is to be displayed in the current interactive chart. If yes, a determination is made as to whether the new element to be displayed is a child of an existing chart, parent, element 915. If yes, the default format of the parent element is applied to this new, child, element to be displayed 920. If no, i.e., the new chart element is not a child of an existing chart element, a default stylistic format for this new chart element is determined 900, and the default format is applied to the chart element as it is displayed in the interactive chart 905.

If it is determined that there is no other element to be currently added to, i.e., displayed in, the interactive chart, at decision block 925 a determination is made as to whether a user has requested one or more child elements be replaced by their respective parent element(s), i.e., that the chart be collapsed. If yes, the currently assigned format for the parent element(s) is applied to each such parent element as it is displayed in the interactive chart 930. This currently assigned format may be a default format, previously determined and assigned to the respective parent element. Alternatively, this currently assigned format may be a user override format previously applied to the parent element upon a user request, as further discussed below.

If a user has not requested one or more child elements be replaced, a determination is made as to whether a user has requested less parent elements be displayed 935, also as a means for collapsing an interactive chart. If yes, user override formats previously assigned to any existing chart element(s) to be displayed are retained 940. For those chart elements that have no user override format, a default format for the chart element is determined and assigned 945. Then, whether it is a user override format, or a default assigned format, the currently assigned format is applied to each chart element displayed in the interactive chart 950.

In an embodiment as described in FIG. 9A, a default format is determined 945 and applied 950 to the child elements still displayed after one or more parent elements are filtered out, i.e., no longer displayed in the interactive chart, if each such child element was not previously assigned a user override format. In this embodiment, a previously assigned user override format is applied to a child element that remains displayed after one or more parent elements are no longer displayed in the interactive chart 940. In this embodiment, however, a new default format may be determined for a child element as it continues to be displayed in the interactive chart. Basically, in this embodiment, if the parent element of a remaining displayed child element would be reassigned a default stylistic format if the parent element were displayed when one or more other parent elements were no longer displayed, the remaining displayed child element is reassigned the default stylistic format its parent element would have been given.

In an alternative embodiment, the currently assigned format, whether it is a default or a user override format, is applied to any child element still displayed in an interactive chart after one or more parent elements are filtered out, i.e., no longer displayed. In this alternative embodiment, a new default format is not determined for a child element as it continues to be displayed in the interactive chart. If any such child element does not have an assigned user override format, it continues to be displayed with its currently assigned default format.

If a user has not requested that less parent elements be displayed, at decision block 955 a determination is made as to whether a user has requested less child elements be displayed in the interactive chart, an additional means for collapsing an interactive chart. If yes, the currently assigned format, whether it is a user override format or a default assigned format, is applied to each chart element displayed in the interactive chart 950.

If the user has not requested a collapse of the interactive chart, or a collapse has already been navigated, at decision block 960 in FIG. 9B a determination is made as to whether there is a user override format change request. If yes, it is determined if the user has requested the format change for a parent element 965. If yes, data identifying the user override format request is stored with the data tuple for the parent element 970, and the user override format is applied to the parent element as it is displayed in the interactive chart 975.

If the user has requested an override format change, but not to a parent element, then the change is for a child element. Data identifying the user override format request is stored with the data tuple for the child element 980, and the user override format is applied to the child element as it is displayed in the interactive chart 985.

At decision block 990, a determination is made as to whether a user has requested a chart collapse, e.g., but not limited to, one or more child elements be expanded so that their respective parent element(s) are displayed, less parent elements be displayed, or less child elements be displayed. If no, at decision block 995 of FIG. 9C a determination is made as to whether a user has requested a child element be displayed. If yes, at decision block 1015 a determination is made as to whether a user override format was previously applied to the child element to be displayed. If yes, the user override format is applied to the child element as it is displayed in the interactive chart 1020. Otherwise, at decision block 1025, a determination is made as to whether a user override format was previously applied to the parent of the child element to be displayed. If yes, data identifying the user override format applied to the parent element is stored with the data tuple for the child element 1030, and the parent, user override, format is applied to the child element as it is displayed in the interactive chart 1035. If, however, no user override format was previously applied to the parent of the child element to be displayed, the currently assigned parent format is applied to the child element 1035.

In an embodiment, if a user has requested a child element be displayed, once the child element is displayed, a determination is again made as to whether the user has requested a child element be displayed 995. Thus, in this embodiment processing is performed on all the child elements a user requests at one time be displayed.

If there is no user request for a child element to be displayed, or the current child element display requests have all been processed, a determination is made as to whether a user has requested a parent element be displayed 1000. If yes, at decision block 1010 a determination is made as to whether the parent element to be displayed has been previously displayed. If yes, the currently assigned format for the parent element is applied to it as it is displayed in the interactive chart 1005. This currently assigned format may be a default format, previously determined and assigned to the respective parent element. Alternatively, this currently assigned format may be a user override format previously applied to the parent element upon a user request.

If it is determined at decision block 1010 that the parent element to be displayed was not previously displayed, i.e., it is a new chart element added to the interactive chart, a default format for this parent element is determined 1040, and the default format is applied to the parent element as it is displayed in the interactive chart 1045.

In an embodiment, if a user requests a parent element be displayed, once the parent element is displayed, a determination is again made as to whether the user has requested a parent element be displayed 1000. Thus, in this embodiment processing is performed on all the parent elements a user requests at one time be displayed.

Figure 10:
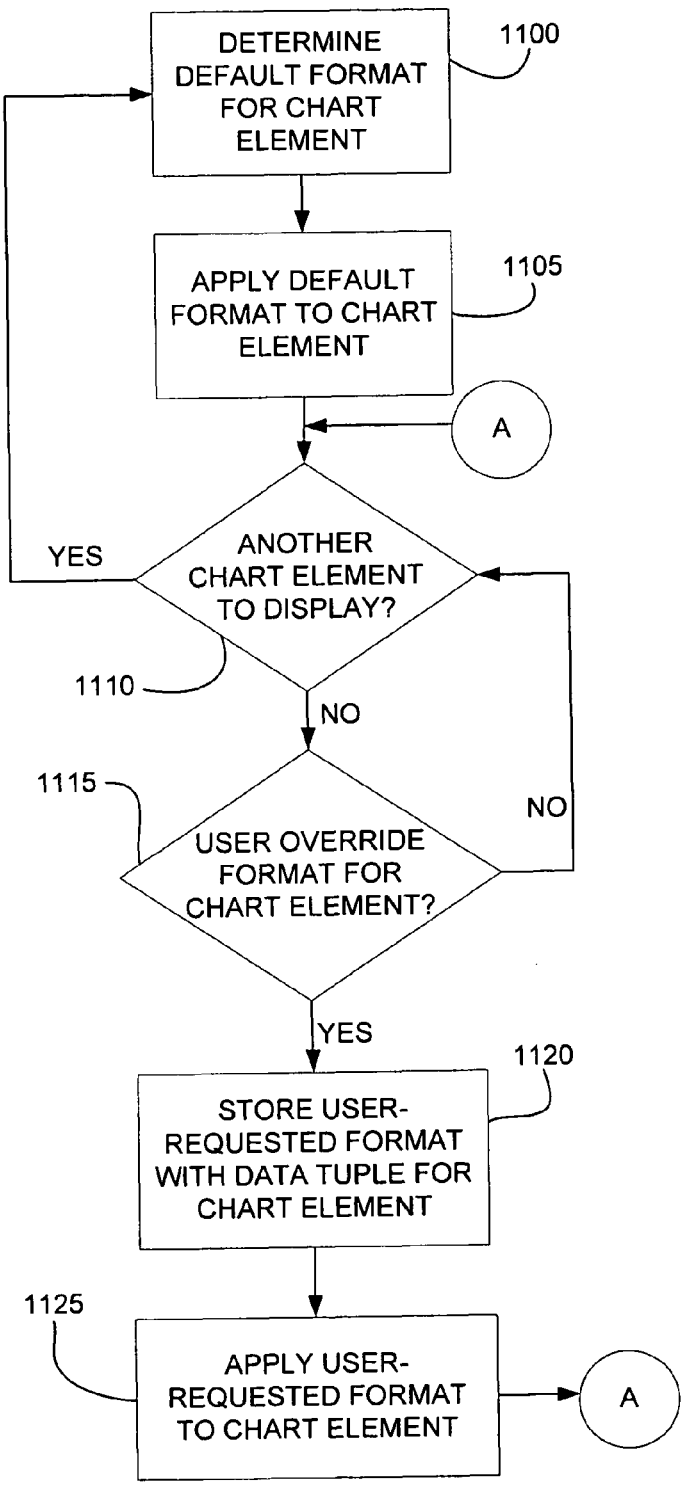
FIG. 10 illustrates an embodiment of a logic flow for enabling persistent layout user formatting for elements of an interactive chart.

FIG. 10 illustrates an embodiment logic flow for a methodology for maintaining persistent user override layout format alterations for interactive chart elements. While the following discussion is made with respect to systems described herein, the operations described may be implemented in other systems. Further, the operations described herein are not limited to the order shown. Additionally, in other alternative embodiments more or fewer operations may be performed.

When a chart element is to be displayed in an interactive chart, a default format for the chart element is determined 1100. This default format is then applied to the chart element as it is displayed in the interactive chart 1105. At decision block 1110, a determination is made as to whether another chart element is to be displayed in the interactive chart. If yes, a default format for this new chart element is determined 1100, and the default format is applied to the chart element as it is displayed in the interactive chart 1105. If, however, no other chart element is currently to be added to the interactive chart, a determination is made as to whether a user has requested an override layout format change for a chart element 1115. If yes, data identifying the user override format request is stored with the data tuple for the chart element 1120, and the user override format is applied to the chart element as it is displayed in the interactive chart 1125.

Figure 11:
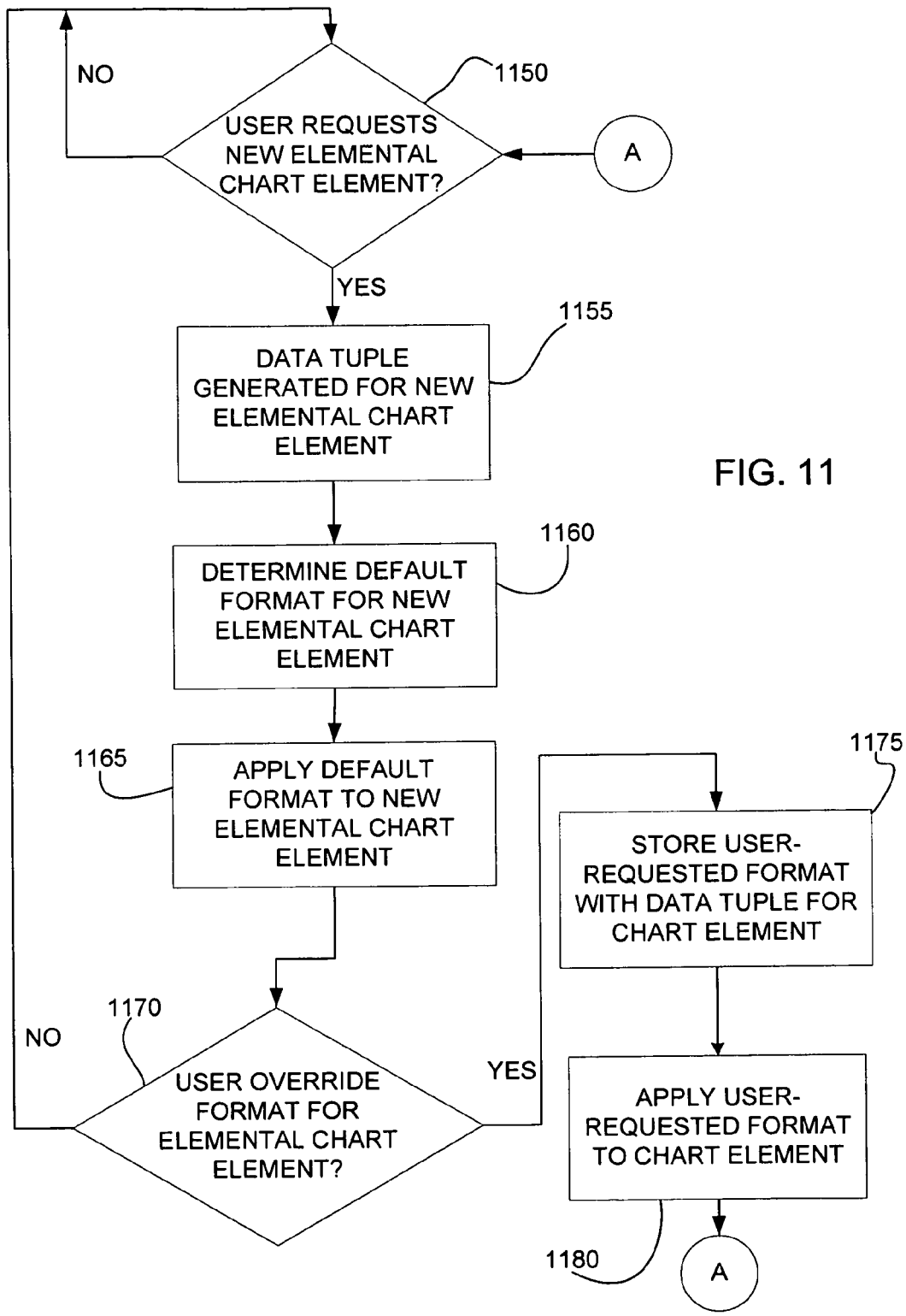
FIG. 11 illustrates an embodiment of a logic flow for enabling persistent elemental user formatting for elements of an interactive chart.

FIG. 11 illustrates an embodiment logic flow for a methodology for maintaining persistent user override elemental format alterations for interactive chart elements. While the following discussion is made with respect to systems described herein, the operations described may be implemented in other systems. Further, the operations described herein are not limited to the order shown. Additionally, in other alternative embodiments more or fewer operations may be performed.

At decision block 1150, a determination is made as to whether a user has requested a new elemental chart element, e.g., but not limited to, a chart legend, be added to and displayed in an interactive chart. If yes, a data tuple is generated for the new elemental chart element 1155. A default format for this new elemental chart element is determined 1160, and the default format is applied to the chart element as it is displayed in the interactive chart 1165.

At decision block 1170, a determination is made as to whether a user has requested an elemental format alteration for a chart element. If yes, data identifying the user override elemental format change is stored with the data tuple for the chart element 1175, and the user override format is applied to the elemental chart element as it is displayed in the interactive chart 1180.

Computer System Configuration

Figure 12:
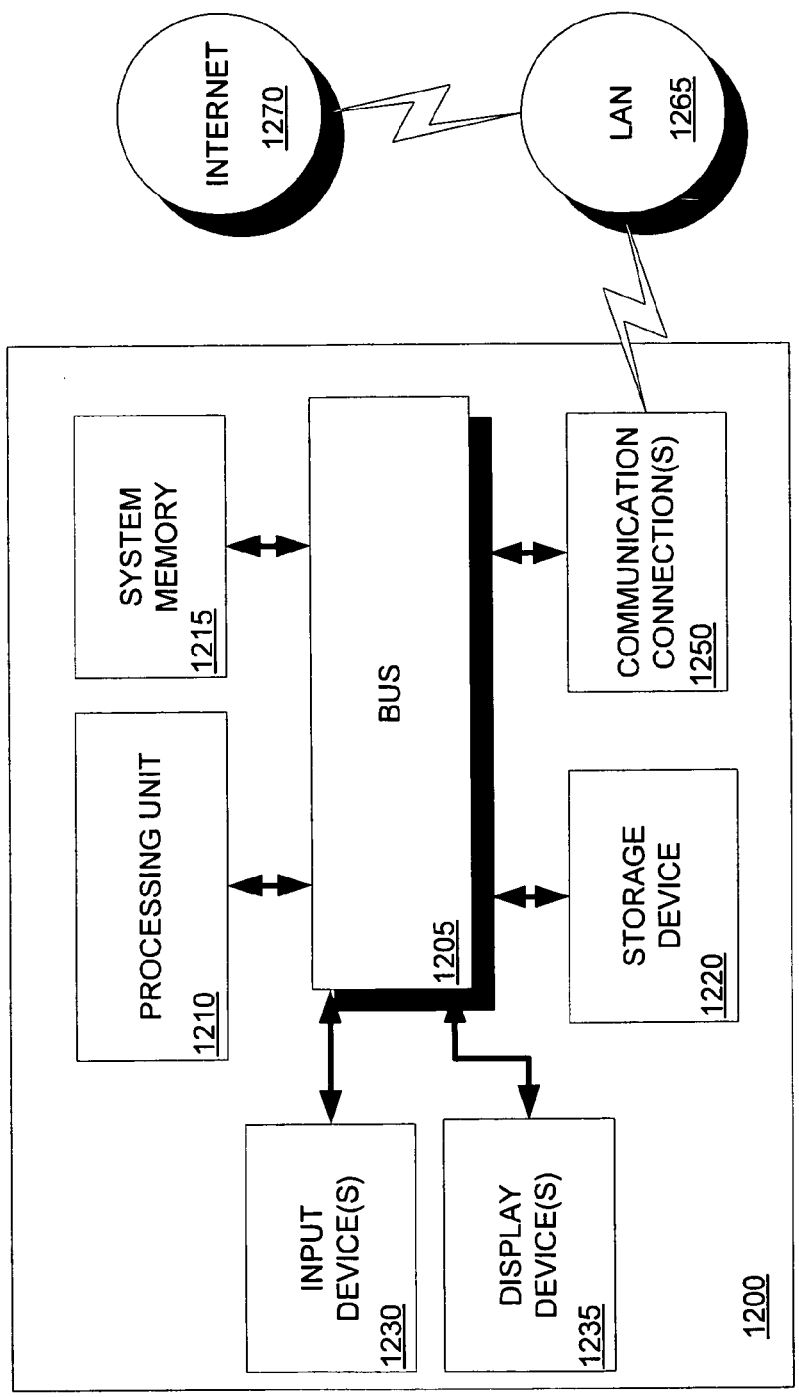
FIG. 12 is a block diagram of an exemplary basic computer system that can process computer software, i.e., program code, or instructions.

FIG. 12 is a block diagram that illustrates an exemplary computer system 1200 upon which an embodiment can be implemented. The computer system 1200 includes a bus 1205 or other mechanism for communicating information, and a processing unit 1210 coupled with the bus 1205 for processing information. The computer system 1200 also includes system memory 1215, which may be volatile or dynamic, such as random access memory (RAM), non-volatile or static, such as read-only memory (ROM) or flash memory, or some combination of the two. The system memory 1215 is coupled to the bus 1205 for storing information and instructions to be executed by the processing unit 1210, and may also be used for storing temporary variables or other intermediate information during the execution of instructions by the processing unit 1210. The system memory 1215 often contains an operating system and one or more programs, and may also include program data.

In an embodiment, a storage device 1220, such as a magnetic or optical disk, is also coupled to the bus 1205 for storing information, including program code comprising instructions and/or data.

The computer system 1200 generally includes one or more display devices 1235, such as, but not limited to, a display screen, e.g., a cathode ray tube (CRT) or liquid crystal display (LCD), a printer, and one or more speakers, for providing information to a computer user. The computer system 1200 also generally includes one or more input devices 1230, such as, but not limited to, a keyboard, mouse, trackball, pen, voice input device(s), and touch input devices, which a computer user can use to communicate information and command selections to the processing unit 1210. All of these devices are known in the art and need not be discussed at length here.

The processing unit 1210 executes one or more sequences of one or more program instructions contained in the system memory 1215. These instructions may be read into the system memory 1215 from another computer-readable medium, including, but not limited to, the storage device 1220. In alternative embodiments, hard-wired circuitry may be used in place of or in combination with software program instructions. Thus, the computer system environment is not limited to any specific combination of hardware circuitry and software.

The term "computer-readable medium" as used herein refers to any medium that can participate in providing program instructions to the processing unit 1210 for execution. Such a medium may take many forms, including but not limited to, storage media and transmission media. Examples of storage media include, but are not limited to, RAM, ROM, EEPROM, flash memory, CD-ROM, digital versatile disks (DVD), magnetic cassettes, magnetic tape, magnetic disk storage, or any other magnetic medium, floppy disks, flexible disks, punchcards, papertape, or any other physical medium with patterns of holes, memory chip, or cartridge. The system memory 1215 and storage device 1220 of the computer system 1200 are further examples of storage media. Examples of transmission media include, but are not limited to, wired media such as coaxial cable(s) and copper wire, and wireless media such as fiber optic signals, acoustic signals, RF signals and infrared signals.

The computer system 1200 also includes one or more communication connections 1250 coupled to the bus 1205. The communication connection(s) 1250 provide a two-way data communication coupling from the computer system 1200 to other computer systems and/or computing devices on a local area network (LAN) 1265 and/or wide area network (WAN), including the World Wide Web, or Internet 1270. Examples of the communication connection(s) 1250 include, but are not limited to, an integrated services digital network (ISDN) card, modem, LAN card, and any device capable of sending and receiving electrical, electromagnetic, optical, acoustic, RF or infrared signals.

Communications received by the computer system 1200 can include program instructions and program data. The program instructions received by the computer system 1200 may be executed by the processing unit 1210 as they are received, and/or stored in the storage device 1220 or other non-volatile storage for later execution.

CONCLUSION

While various embodiments are described herein, these embodiments have been presented by way of example only, and are not intended to limit the scope of the claimed subject matter. Many variations are possible which remain within the scope of the following claims. Such variations are clear after inspection of the specification, drawings and claims herein. Accordingly, the breadth and scope of the claimed subject matter is not to be restricted except as defined with the following claims and their equivalents.

What is claimed is:

1. A method comprising:
   providing an interactive chart comprising at least a first, second, and third chart element, the first chart element indicative of a first set of data, the second chart element comprising a child element of the first chart element and indicative of a subset of the first set of data, and the third chart element indicative of a third set of data, the third chart element not a child element of either the first or second chart elements;

displaying the first and third chart elements of the interactive chart; and receiving a first command to expand the first chart element such that the second chart element is displayed, and upon receiving the first command, displaying at least the second chart element and the third chart element of the interactive chart.

2. The method of claim 1, the interactive chart comprises a fourth chart element comprising a child element of the third chart element and indicative of a subset of the third set of data, the method comprising:

upon receiving the first command to expand the first chart element such that the second chart element is displayed, not displaying the fourth chart element of the interactive chart.

3. The method of claim 2, comprising:

upon receiving a second command to expand the third chart element such that the fourth chart element is displayed, displaying at least the fourth chart element of the interactive chart.

4. The method of claim 1, a first default format applied to the first chart element and a second default format applied to the second chart element, the method comprising:

receiving a format change to the first default format;

applying the format change to the second default format if the second default format has not been overridden by a request to apply an override format to the second chart element; and not applying the format change to the second default format if the second default format has been overridden by a request to apply the override format to the second chart element.

5. The method of claim 4, the format change conflicting with the override format such that format change cannot be applied to the second chart element without altering the override format.

6. The method of claim 4, the interactive chart a PivotChart.

7. A computer readable storage medium comprising computer executable instructions that when executed by a microprocessor perform a method, the method comprising:

providing an interactive chart comprised of at least a first and second chart element, respective chart elements indicative of respective sets of data;

displaying at least the first and second chart elements of the interactive chart;

receiving a command to expand the first chart elements such that at least third and fourth chart elements, respectively representative of subsets of data represented by the first element, are displayed; and displaying at least the second, third, and fourth chart elements of the interactive chart based upon the received command to expand the first chart element.

8. The computer readable storage medium of claim 7, comprising not displaying the first chart element while the third and fourth chart elements are displayed.

9. The computer readable storage medium of claim 7, a first default format applied to the first chart element, the method comprising:

receiving a format change to the first default format; and upon expanding the first chart element to display at least the third and fourth chart elements:

applying the format change to a second default format that is applied to the third chart element if the second default format has not been overridden by a request to apply a first override format to the third chart element, not applying the format change to the second default format if the second default format has been overridden by a request to apply the first override format to the third chart element, applying the format change to a third default format that is applied to the fourth chart element if the third default format has not been overridden by a request to apply a second override format to the fourth chart element; and not applying the format change to the third default format if the third default format has been overridden by a request to apply the second override format to the fourth chart element.

10. The computer readable storage medium of claim 9, comprising not displaying the first chart element while the third and fourth chart elements are displayed.

11. The computer readable storage medium of claim 9, the interactive chart a PivotChart.

12. The computer readable storage medium of claim 7, a fifth chart element representative of a subset of data represented by the second chart element not displayed in the interactive chart when a command to expand the first chart element is received.

13. The computer readable storage medium of claim 12, comprising:

receiving a command to expand the second chart element such that at least the fifth chart element is displayed;

if the first chart element is expanded, displaying at least the third, fourth, and fifth chart elements of the interactive chart based upon the received command to expand the second chart element; and if the first chart element is collapsed such that that third and fourth elements are not displayed, displaying at least the first and fifth chart elements.

14. A method of applying formatting to chart elements of an interactive chart to be displayed to a user of a computer system, the interactive chart comprising at least a first chart element indicative of a first set of data and a second chart element comprising a child element of the first chart element, the second chart element indicative of a second set of data, the second set of data a first subset of the first set of data, the method comprising:

selecting a first default format to be applied to the first chart element displayed in the interactive chart;

receiving a request to apply a first override format to at least the first chart element; and after receiving the request to apply the first override format:

upon displaying the interactive chart while collapsed to display the first chart element and not display the second chart element, applying the first override format to the first chart element;

upon displaying the interactive chart while not collapsed to display the second chart element, applying the first override format to the second chart element if a request to apply a second override format to the second chart element has not been received; and upon displaying the interactive chart while not collapsed to display the second chart element, not applying the first override format to the second chart element if a request to apply the second override format to the second chart element has been received.

15. The method of claim 14, the interactive chart a PivotChart.

16. The method of claim 15,
the PivotChart generated from an interactive table,
the interactive table built from a data cache, and
the data cache created from data in a data source.

17. The method of claim 14, comprising, before receiving a request to apply the first override format to at least the first chart element, selecting a second default format to be applied to the second chart element displayed in the interactive chart.

18. The method of claim 17, comprising, before receiving a request to apply the first override format to at least the first chart element:
    upon displaying the interactive chart while collapsed to display the first chart element and not display the second chart element, applying the first default format to the first chart element; and
    upon displaying the interactive chart while not collapsed to display the second chart element, applying the second default format to the second chart element.

19. The method of claim 14, the first chart element having a data tuple associated with it and data identifying the first override format is stored with the data tuple associated with the first chart element.

20. The method of claim 14, the first override format and the second override format conflicting such that the first and second override formats cannot be applied to the second chart element concurrently.

* * * * *